United States Patent [19]

Kroll et al.

[11] Patent Number: 5,702,071
[45] Date of Patent: Dec. 30, 1997

[54] DEPLOYABLE VORTEX TURBINE FOR DISSIPATING OR EXTRACTING ENERGY FROM A LIFT INDUCED VORTEX EMANATING FROM AN AIRCRAFT

[75] Inventors: William B. Kroll, Roscoe; Patrick D. Curran, Rockford, both of Ill.

[73] Assignee: Sundstrand Corporation, Rockford, Ill.

[21] Appl. No.: 481,679

[22] Filed: Jun. 7, 1995

[51] Int. Cl.$^6$ ............................ B64C 23/06; B64D 41/00
[52] U.S. Cl. ................................................ 244/199; 244/58
[58] Field of Search ................................ 244/130, 55, 58, 244/199

[56] References Cited

U.S. PATENT DOCUMENTS

| | | | |
|---|---|---|---|
| 1,990,606 | 2/1935 | Junkers | 244/199 |
| 4,533,101 | 8/1985 | Patterson, Jr. | 244/199 |
| 4,883,240 | 11/1989 | Adamson et al. | 244/55 |

Primary Examiner—Andres Kashnikow
Assistant Examiner—Virna Lissi Mojica
Attorney, Agent, or Firm—Lawrence E. Crowe

[57] ABSTRACT

An aircraft (10) including a stowable, wingtip mounted, vortex turbine (30) for dissipating or extracting energy from a lift induced vortex (28) emanating from the aircraft (10) is provided. The vortex turbine (30) includes a first and a second array (38, (40) of blades (32a,b) (34a,b) extending respectively from a first and a second hub section (32), (34). Hub sections (32), (34) may be independently pivoted about a common axis of rotation (36) to a stowed position for landing, take-off, or ground operation, whereat none of the blades (32a,b) (34a,b) extend below a minimum ground clearance of the aircraft, or beyond a maximum horizontal extension of the wing (16). In flight, the hub sections (32), (34) may be deployed and the pitch of the blades adjusted to maximize dissipation of the lift induced vortex (28), thereby minimizing drag and providing improved safety for other aircraft flying through the wake of the aircraft (10) producing the vortex (28). The hub sections (32, 34) may also be locked together to form a turbine wheel (46) having a circumferentially symmetrical array of blades. The turbine wheel (46) is rotatable about the axis of rotation (36) for extracting usable energy from the lift induced vortex (28) and/or free stream air passing through the turbine wheel (46).

24 Claims, 6 Drawing Sheets

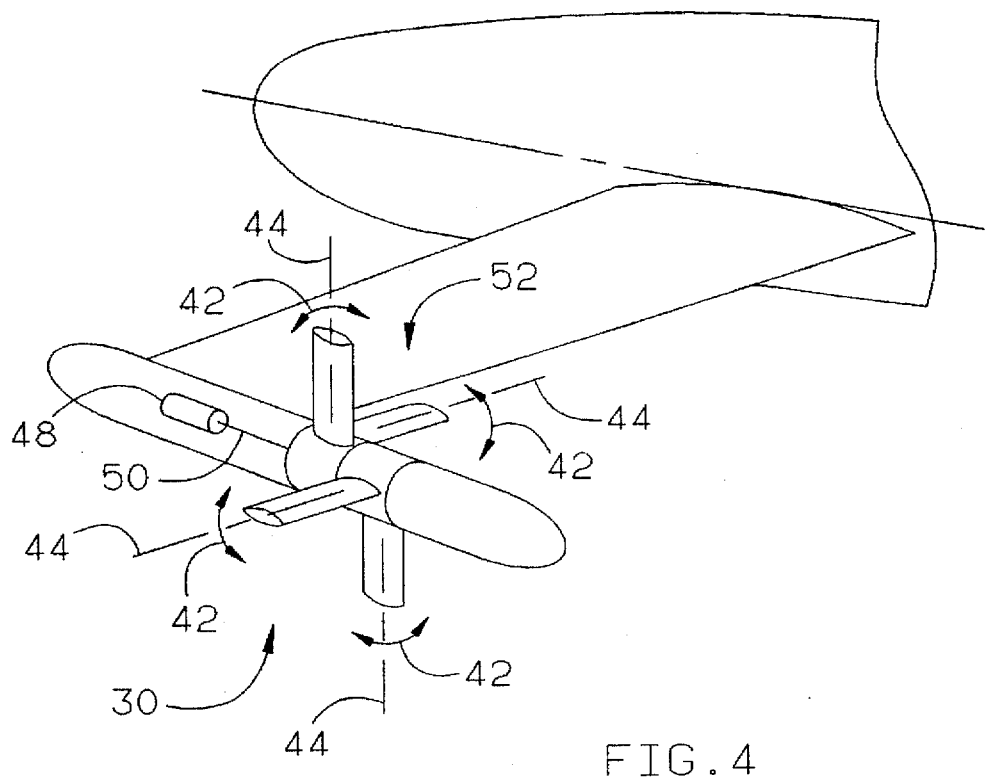
FIG.4
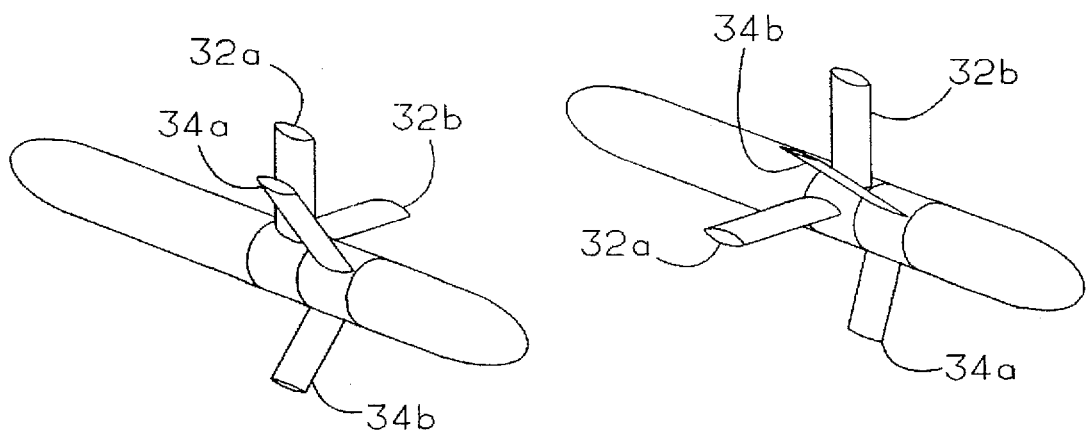
FIG.5
FIG.6

DEPLOYABLE VORTEX TURBINE FOR DISSIPATING OR EXTRACTING ENERGY FROM A LIFT INDUCED VORTEX EMANATING FROM AN AIRCRAFT

TECHNICAL FIELD

This invention relates generally to aircraft aerodynamics, and more particularly to a vortex turbine which is: deployable in flight for recovery of energy from a lift induced vortex at or near the ends of aircraft wings, flaps, or control surfaces; and stowable during landing, takeoff, or ground operations within an envelope defined by either the minimum ground clearance and/or the maximum horizontal extension of the wing of the aircraft prior to installing the vortex turbine. The vortex turbine of our invention has both non-rotating and rotating modes of operation. In various non-rotating modes, the vortex turbine converts energy within the air flow about the aircraft into thrust or lift forces for counteracting drag on the aircraft and dissipating the lift induced vortex. In a rotating mode, the vortex turbine extracts energy from air flow about the aircraft and converts it into rotary motion for driving a power producing device such as an electrical generator, air compressor or a hydraulic pump, while simultaneously providing a reduction in drag and dissipation of the lift induced vortex.

BACKGROUND

Aircraft wings are shaped to produce lift when the aircraft is propelled through the air. Specifically, the wings are shaped to create a higher pressure in air passing under the wing than in air passing over the wing. The difference in the pressure under and over the wing multiplied by the wing area creates the lift needed for the aircraft to fly.

As a by-product of producing lift, however, aircraft wings also produce a spiraling lift-induced vortex emanating from each wingtip, or from the outboard ends of control surfaces such as aelerons or flaps. This vortex is created by a portion of the higher pressure air under the wing "leaking" around the wingtip to the lower pressure zone above the wing. These vortices create additional induced drag on the aircraft, thereby reducing fuel efficiency and increasing operating cost. These vortices can also be dangerous to other aircraft following or flying through the wake of the aircraft which created the vortex. Small aircraft can be caught in the vortex created by a larger aircraft and encounter significant problems maintaining controlled flight even at distances as great as four miles behind the aircraft which created the wake. In response to this danger, the FAA has imposed minimum spacing requirements between aircraft in flight. While these restrictions may effectively preclude the danger of loss of control, they significantly expand the flight patterns around airports, thus creating inefficiency and delay as well as increasing fuel burn, and aircraft operating costs, which ultimately lead to higher costs to passengers or shippers.

Through the years, many devices have been proposed or utilized to dissipate these lift induced vortices. Various types of winglets, fences, stationary vortex turbines, or airfoils positioned at or near the wingtips have been suggested. U.S. Pat. No. 4,172,574 to Spillman provides an illustration of such fences, which are referred to therein as "sails" or "sail-like members". However, these function merely to minimize or disrupt the vortex.

Another approach, illustrated in U.S. Pat. No. 4,917,332 to Patterson, U.S. Pat. No. 5,100,085 to Rubbert, and U.S. Pat. No. 5,150,859 to Ransick, utilizes a rotatable vortex turbine mounted at the wingtip to intercept the lift induced vortex and extract rotational energy from the vortex for use in driving devices such as pumps, generators, compressors, or propellers. This type of device thus provides three benefits—dissipation of the vortex—drag reduction—and conversion of otherwise wasted rotational energy in the vortex to a useful form. Patterson also teaches that drag reduction for his device is maximized when the turbine is not rotating, i.e. locked in place at a turbine rotating speed=0 rpm.

Devices for dissipating or extracting the rotational energy from lift-induced vortices thus provide significant advantages with regard to aircraft operation. Drag reductions of several percent are possible. The energy available at each wingtip of a large aircraft can be on the order of 400 horsepower. Dissipation of the vortex allows closer spacing of aircraft on the ground and in flight patterns around airports.

Despite the potential advantages provided by such vortex dissipating or energy extracting devices, they have not been widely utilized to date. One reason for this lack of acceptance has been that many of the prior devices extended below a minimum ground clearance or beyond a maximum horizontal extension of the wing as it existed prior to the addition of the vortex dissipating or energy extracting device. The prior devices thus encroached upon area needed to service the aircraft, and increased the wingspan, thereby requiring wider spacing of aircraft on airport taxiways and service areas.

As illustrated in FIG. 1, minimum ground clearance is typically defined by the construction of the aircraft 10, generally, and in particular by the aircraft body 12 and wings 16, including any engines, etc. hanging from the wings. Specifically, the minimum ground clearance 'c' is often defined by the distance between the wingtip 18 and the ground when the aircraft 10 is rolling with one landing gear 13 touching the ground and the lowest engine nacelle 17, etc., touching the ground. For some aircraft the minimum ground clearance available is insufficient to allow the use of a winglet, airfoil, or a vortex turbine having blades of sufficient length to effectively dissipate or extract energy from the lift induced vortex. On aircraft where the ground clearance is insufficient, the use of such devices for dissipating or extracting energy from the vortex is thus precluded unless some means is provided for retracting or stowing them during takeoff and landing.

We wish to emphasize that the aircraft depicted in FIG. 1 is exemplary only. In other aircraft, having engines mounted on the fuselage for instance, the engine nacelles might not be a factor in defining the minimum ground clearance. A minimum ground clearance will none-the-less exist under the wing of any aircraft. As used herein with regard to defining minimum ground clearance, the term "aircraft body" is intended to encompass the fuselage, the landing gear, and any part of the aircraft other than the wings. The term "wing" includes not only the wing itself or other airfoils such as horizontal stabilizers, etc., but also any appendages thereto, such as the engine nacelle 17 of FIG. 1.

Vortex dissipating or energy extracting devices of simple construction, such as a single winglet or airfoil, can sometimes be retracted or folded out of the way as taught in Spillman '574. Some multi-bladed devices used exclusively for dissipation may also be folded as taught by U.S. Pat. No. 4,917,332 to Patterson.

For more complex devices, however, and in particular for rotating vortex turbines extracting power from the vortex, such as those taught by Patterson '332, Rubbert '859 and Ransick '085, the problem of providing practical retraction or stowage means is much more difficult. For devices utilizing an array of blades, there may not be sufficient space in the wingtip to allow for retraction into the wing, or to allow the blades to be folded out of the way. For rotating devices which extract power from the vortex for driving a generator or pump, the need to maintain operative connection of the driveline between the rotating device and the generator or pump can require complex coupling devices or flexible joints in the driveline to allow for retraction or folding of the blades. Rotating devices also generally involve a circumferentially symmetrical array of blades attached to a hub that is mounted for rotation about an axis of rotation. If these circumferentially symmetric devices are mounted at a wingtip, at least one of the blades will inherently extend either horizontally beyond the wingtip, or below the wing in any angular orientation of the rotating device. Furthermore, such devices must remain balanced during rotation. It is difficult to provide and maintain the required balance in devices having folding or retracting blades.

Some prior rotating vortex turbines were also tailored to efficiently extract power only from the rotational energy of the lift induced vortex, and not from free stream air passing through the vortex turbine. Under flight conditions in which the vortex is weak, or where the demand for power is large, the rotational energy component sometimes is not sufficient to provide an effective source of auxiliary power. It is desirable, therefore, to have a turbine which can effectively and efficiently extract power from either or both of the rotational energy of lift induced vortex or the free stream air passing through the vortex turbine. As used herein, the term rotational energy of the lift induced vortex refers to energy causing the spiraling motion of the air in the lift induced vortex itself. With respect to the axis of rotation, the air in the lift induced vortex includes a tangentially directed component, a large axially rearward directed component, and a respectively smaller component of motion in a radially outward direction. As used herein, the term free stream air means any air motion about the aircraft and specifically through the vortex turbine which is not a component of the spiraling motion of the lift induced vortex. The motion of the free stream air will thus generally have a predominant component of motion parallel to the axis of rotation and opposite a direction of flight of the aircraft.

Accordingly, it is an object of our invention to provide an improved aircraft having a vortex turbine for dissipating or extracting energy from a lift induced vortex emanating from the aircraft and/or from free stream air passing through the vortex turbine. Other objects of our invention include providing:

(1) An aircraft having a vortex turbine attached thereto which does not extend below a minimum ground clearance or beyond a maximum horizontal extension of the aircraft wing during takeoff, landing, or while the aircraft is not airborne;

(2) An aircraft including a practical and efficient vortex turbine which may be deployed in flight to dissipate or extract energy from a lift induced vortex emanating from the aircraft, and stowed during takeoff, landing or on-ground operation of the aircraft in such a manner that blades of the vortex turbine do not extend below a minimum ground clearance or beyond a maximum horizontal extension of the aircraft wing;

(3) A vortex turbine as described in 1-2 above which includes a circumferentially symmetrical array of blades disposed about an axis of rotation of the vortex turbine;

(4) A deployable vortex turbine as described in 1-3 above and having pitch controllable blades to optimize performance under varying aircraft operating conditions;

(5) A deployable vortex turbine which utilizes the rotational energy in the vortex and/or in free stream air passing through the vortex turbine as a source of motive power for deploying or stowing the vortex turbine; and (6) An inexpensive arrangement for providing the vortex turbine described in 1-5 above, and allowing ready incorporation of such a vortex turbine into new or existing aircraft.

SUMMARY

Our invention achieves the above objects by providing an aircraft that includes a stowable, wingtip mounted, vortex turbine for dissipating or extracting energy from a lift induced vortex emanating from the aircraft. The vortex turbine includes a first and a second array of blades extending respectively from a first and a second hub section. One or both of the hub sections may be independently pivoted about a common axis of rotation to a stowed position for landing, take-off, or ground operation, whereat none of the blades extend below a minimum ground clearance of the aircraft or beyond a maximum horizontal extension of the wing. In flight, at least one, and possibly both of the hub sections may be pivoted about the axis to one of several deployed positions, and the pitch of the blades adjusted to maximize dissipation of the lift induced vortex, thereby minimizing drag and providing improved safety for other aircraft flying through the wake of the aircraft producing the vortex. To re-stow the vortex turbine, the rotatable hub sections are pivoted to an angular position whereat the blades no longer encroach upon a forbidden area such as the minimum ground clearance below the aircraft wing, or horizontally beyond the tip of the wing.

In some embodiments of our invention, the hub sections may also be locked together to form a turbine wheel having a circumferentially symmetrical array of blades. With the hub sections locked together, the turbine wheel is rotatable about the common axis of rotation for extracting usable energy from the lift induced vortex and/or from free stream air passing through the turbine wheel. A power conversion device, such as a pump or an electrical generator, driven by the turbine wheel converts the energy extracted from the vortex by the rotating turbine wheel into a form of power, such as hydraulic power or electricity, usable by the aircraft.

The ability to rotate one of the hub sections independent of the other thus provides a convenient and straight-forward method for eliminating the ground clearance and wing extension problems encountered in prior vortex turbines. An aircraft may thus be provided with an efficient drag reducing or power extracting vortex turbine attached at a wingtip, even where such a vortex turbine requires a blade longer than the minimum ground clearance available on take off, landing or during ground operation.

Specifically, our invention is applicable to an aircraft having a body defining a fore and aft axis of the aircraft, and a wing extending generally horizontally from the aircraft body to a wingtip at an outboard distal end of the wing. The aircraft in general and the wing in particular define a minimum ground clearance of the wing, with the wingtip also defining a maximum horizontal extension of the wing. A deployable vortex turbine is attached to the aircraft in a manner allowing the vortex turbine to intercept a lift induced vortex generated by a portion of the wing. The vortex turbine includes a turbine having a first and second hub section disposed about an axis of rotation oriented generally parallel to the fore and aft axis of the aircraft. Each of the first and second hub sections have at least one blade extending generally radially therefrom with respect to the axis of rotation. Apparatus is provided for pivoting at least one of the hub sections about the axis from a deployed position whereat at least one blade on the rotatable hub section extends either below the minimum ground clearance or beyond the maximum horizontal extension of the wing, to a stowed position at which the blade does not extend below the minimum ground clearance or beyond the maximum horizontal extension of the wing.

In various preferred embodiments of our invention, either one or both of the hub sections is pivotable about the axis. The ability to adjust the relative angular position of the hub sections, and thus also the blades extending therefrom, allows an additional degree of freedom for optimizing drag reduction as compared to prior drag reducing devices having blades whose angular positions to one another are fixed. As flight conditions change, our invention allows the relative position of the hubs to be adjusted to an orientation that provides maximum dissipation of the lift induced vortex. The pitch of the blades is also controllable in flight to allow for further fine-tuning and optimization of drag reduction.

A wide variety of devices may be utilized to provide motive power for adjusting the position of the hub sections and blades. In some preferred embodiments, motive power for adjusting the position of the hub sections is provided solely by the lift induced vortex itself, or by free stream air flowing through the vortex turbine. Our invention is thus readily adaptable to new or existing aircraft.

According to other aspects of our invention, the hub sections may be locked together in flight to form a rotatable turbine wheel capable of extracting energy from the lift induced vortex to drive a device such as a pump or generator. Our invention thus provides a means for reducing drag and dissipating the vortex while simultaneously converting energy in the lift induced vortex to a usable form.

In a highly preferred embodiment of our invention, therefore, the aircraft may be conveniently serviced, taxi, and take off with the vortex turbine in the stowed position by virtue of the maximum ground clearance and minimum horizontal extension of the wing provided by our invention. Once the aircraft becomes airborne, the vortex turbine may be deployed and drag reduction optimized by adjusting the relative angular position of the hub sections. As flight conditions change, both the angular position of the hub sections and the pitch of the blades may be adjusted to optimize drag reduction.

Should additional electrical or hydraulic power be needed during the flight, the hub sections are pivoted to an angular position whereat they form a turbine wheel having a circumferentially symmetrical array of blades to maintain dynamic balance of the wheel. The turbine wheel is then released to drive a pump or generator supplying hydraulic or electrical power to the aircraft. Prior to landing, the vortex turbine may be returned to the stowed position to provide maximum ground clearance and/or minimum wing extension during landing and ground service operations.

Dissipation of the vortex in all of the embodiments summarized above significantly reduces the risk of loss or control by other aircraft flying through the wake of the aircraft having our vortex turbine installed. Spacing requirements between aircraft in flight could, therefore, potentially be reduced if all aircraft were equipped with vortex dissipating devices such as the vortex turbine of our invention.

Other objects, advantages, and novel features of our invention will be readily apparent upon consideration of the following drawings and detailed descriptions of preferred embodiments.

BRIEF DESCRIPTION OF THE DRAWINGS

FIGS. 2–7 depict various operational modes of a vortex turbine attached to an exemplary aircraft according to our invention;

DESCRIPTION OF PREFERRED EMBODIMENTS

Figure 1:
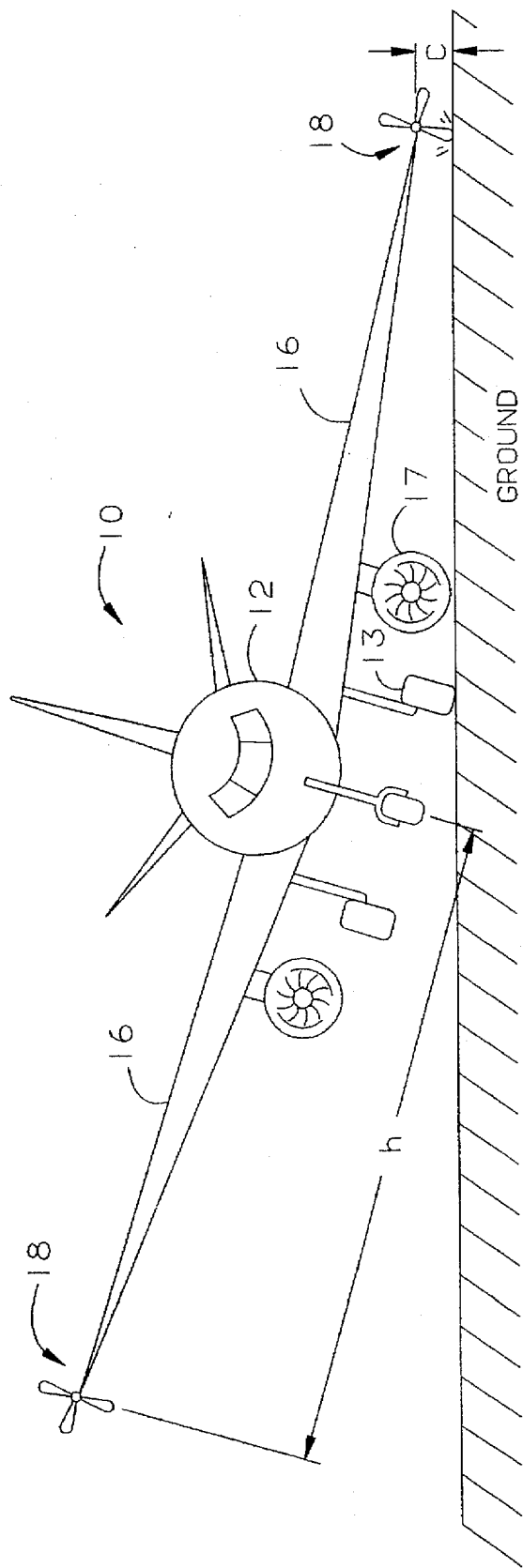
FIG. 1 is an illustration of prior aircraft having a vortex turbine including blades that extend below a minimum ground clearance of the aircraft, and beyond a maximum horizontal extension of the wing.
Figure 2:
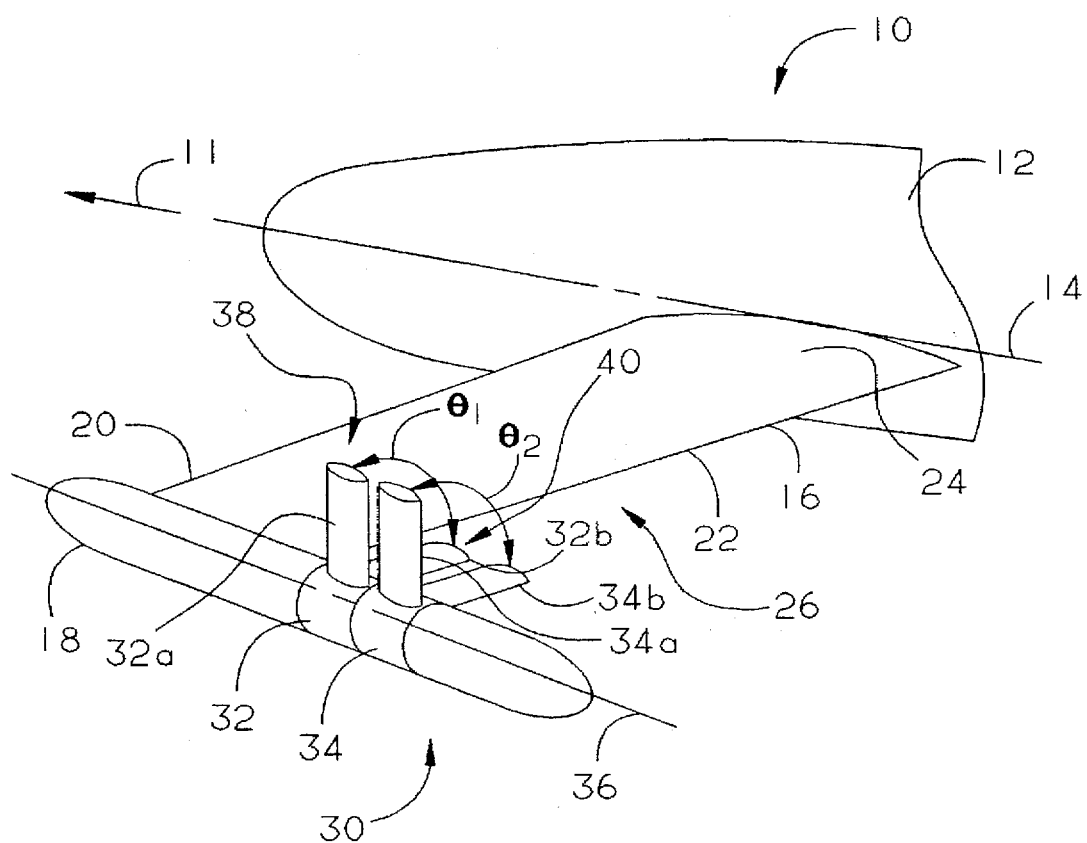

FIGS. 2–8 depict an exemplary embodiment of our invention in the form of an aircraft 10 having a body 12 defining a fore and aft axis 14 extending generally along a direction of flight 11 of the aircraft 10 when the aircraft 10 is airborne. As shown in FIGS. 1 and 2, a wing 16 extends generally horizontally from the body 12 to a wingtip 18 at an outboard, distal end 18 of the wing 16. The wing 16 includes a leading edge 20 and a trailing edge 22 connected by an upper surface 24 and a lower surface 26 of the wing.

The wing 16 is shaped to form a lift producing airfoil such that when air is made to flow across the wing 16 from the leading edge 20 to the trailing edge 22 of the wing, by virtue of propulsion of the aircraft 10 in the direction of flight 11, air flowing over upper surface 24 of the wing 12 is reduced to a lower pressure than air flowing under the lower surface 26 of the wing 12. The difference in air pressure flowing over and under the wing 12, multiplied by the area of the lower surface 26 of the wing 12, produces the lift necessary for the aircraft to take-off and fly.

Figure 3:
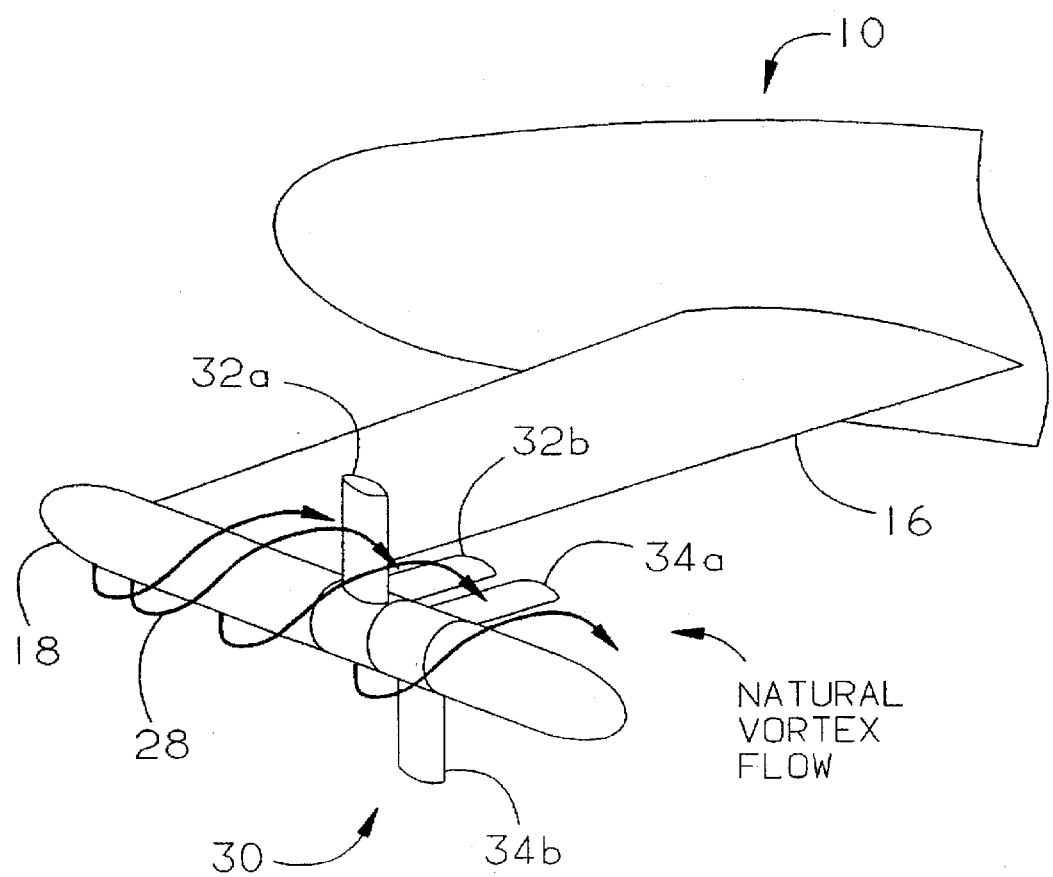

As a by-product of producing lift, however, some of the higher pressure air under the wing 16 flows around the wingtip 18 toward the upper surface 24 of the wing 16. As shown in FIG. 3, this "leakage" flow around the wingtip 18 generates a spiraling lift-induced vortex 28 emanating from the wingtip 18 and trailing behind the aircraft 10.

As shown in FIGS. 2–7, a vortex turbine 30 is attached to the wingtip 18 and disposed to intercept the lift induced vortex 28. As shown in FIG. 2, the vortex turbine 30 includes a first hub section 32 and a second hub section 34 disposed about an axis of rotation 36 extending generally parallel to the fore and aft axis 14 of the aircraft. A first pair of blades 32a,b extend generally radially outward, with respect to the axis of rotation, from the first hub section 32. The blades 32a,b extend from the first hub Section 32 at a fixed angle $\theta_1$, with respect to each other, to form a first array 38 of blades. In the vortex turbine 30 of FIGS. 2–8, the blades 32a,b are positioned generally at a right angle from one another, i.e. $\theta_1 = 90°$, but other angles $\theta_1$ less than or greater than 90° may also be utilized within the scope of our invention for embodiments having other blade array configurations which might be more advantageous for a given aircraft.

In similar fashion, a second pair of blades 34a,b extend generally radially outward, with respect to the axis of rotation 36, from the second hub section 34 to form a second array of blades 40. The second pair of blades 34a,b are also affixed to the second hub section 34 at a fixed angle $\theta_2$ with respect to one another. In the exemplary embodiment, the second pair of blades 34a,b are affixed to the second hub section generally at a right angle to one another, i.e. $\theta_2$=90°.

As shown in FIGS. 2–6, at least one of the hub sections 32, 34 may be pivoted about the axis of rotation 36 from a stowed position, as indicated in FIG. 2, whereat none of the blades 32a,b; 34a,b extend beyond the wingtip 18 or below the wing 12, to a deployed position as shown in FIGS. 3–6 where at least one of the blades 32a,b; 34a,b does extend either beyond the wingtip 16 or below the wing 12. FIGS. 3–5 illustrate angular positions achievable through pivoting only the second hub section 32, and FIG. 6 illustrates an angular position achievable if both hub sections 32, 34 are pivoted about the axis of rotation 36.

Our invention thus allows the blades 32a,b; 34a,b to be stowed, as shown in FIG. 2 during take-off, landing and ground operation of the aircraft 10 to preclude contact of the blades with the ground, or undesirable extension of the maximum horizontal length "h" of the wing as shown in FIG. 1. Once the aircraft 10 is in flight, one or both of the hub sections 32, 34 may be pivoted to a deployed position for efficient dissipation of the vortex 28, as shown in FIGS. 3–7. Prior to landing, the blades 32a,b; 34a,b may be readily re-stowed to the position indicated in FIG. 2 to once again provide maximum clearance for landing and ground service operations.

As illustrated by arrows 42 in FIG. 4, our invention also contemplates the ability to re-position the pitch of the blades about blade pitch axes 44 extending generally radially from the axis of rotation 36 of the hub sections 32, 34 through the blades 32a,b; 34a,b. This ability to adjust blade pitch 42 in conjunction with the ability to adjust the angular relationship between the first and second arrays 38, 40 of blades, allows the vortex turbine 30 of our invention to be fine tuned over a wide range of positions in flight. By fine tuning blade pitch and position in flight, dissipation of the vortex 28 may be maximized, thereby minimizing both drag, and the risk of vortex induced control problems for other aircraft flying through the wake of the aircraft 10 of our invention.

Figure 7:
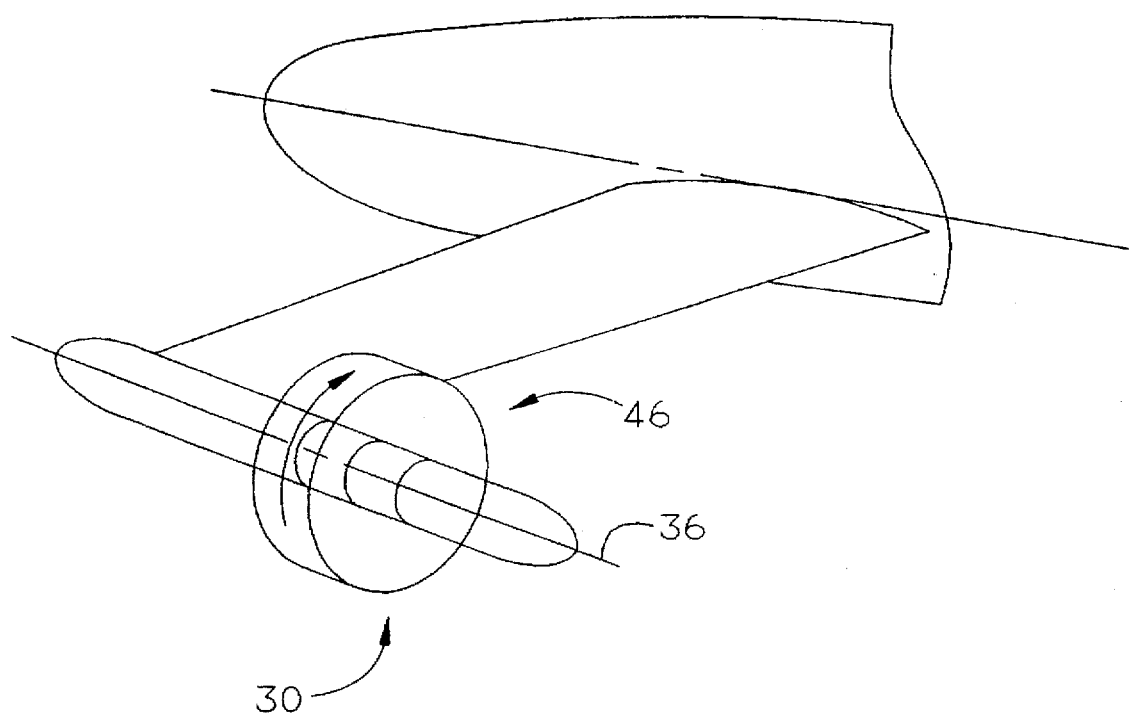
Figure 8:
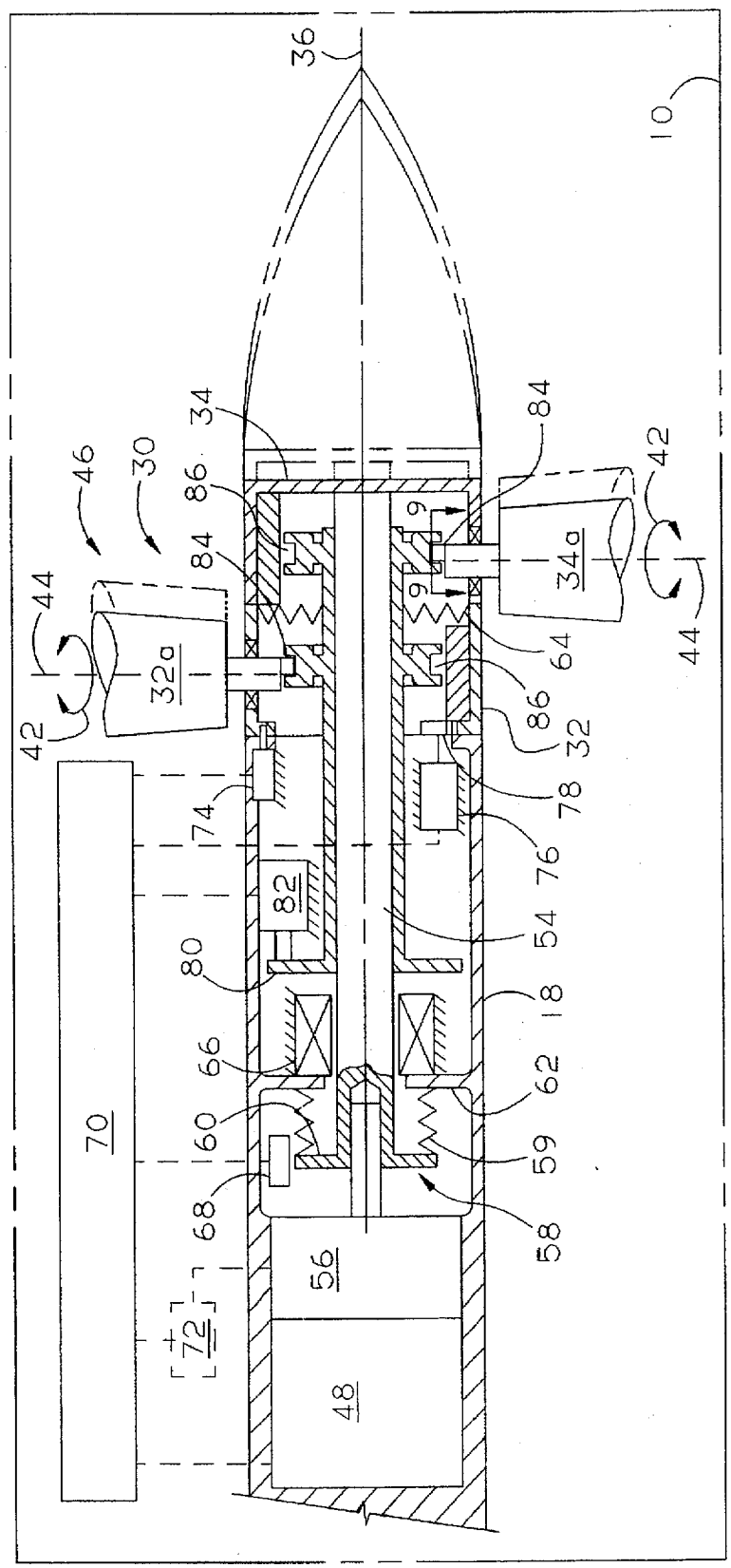
FIG. 8 is a schematic cross-sectional view of a wingtip of an aircraft depicting various control and actuation elements according to our invention.

As shown in FIGS. 4 and 7, our invention also contemplates an operational mode in which the vortex turbine 30 is utilized to extract usable shaft power from the vortex or free stream air passing through the vortex turbine 30. In preparation for extracting power, the hub sections 32, 34 are positioned such that the blades 32a,b; 34a,b form a circumferentially symmetrical array 52 about the axis of rotation 36. Specifically, for the exemplary embodiment of FIGS. 2–7, such a circumferentially symmetrical array is formed when the hub sections 32, 34 are positioned as shown in FIG. 4, and the four blades 32a,b; 34a,b are circumferentially equally spaced at right-angles from one another. The hub sections 32, 34 are then locked together to be rotatable as an integral turbine wheel 46 about the axis of rotation 36. As shown in FIG. 7, the turbine wheel 46 is then released to be rotatably driven about the axis of rotation 36 by the vortex 28, or free stream air passing through the turbine blades 32a,b; 34a,b. Rotational energy from the vortex 28 and/or the free stream is utilized to drive a driven device 48 such as a pump or an electrical generator operably coupled by drive means 50 to the turbine wheel 46, as illustrated schematically in FIG. 4. As shown in FIG. 8, it may be desirable in some embodiments of our invention to utilize counterweights 35 attached to an inner or outer wall of the hub sections 32,34 at a point diametrically opposite the blades 32a,b; 34a,b for balancing the vortex turbine 30.

To preserve maximum ground clearance, our invention contemplates that prior to landing, rotation of the turbine wheel 46 would be stopped, and the vortex turbine 30 returned to a stowed position such as the position shown in FIG. 2. Our invention also contemplates, however, embodiments in which it is desired to utilize the vortex turbine 30 in a rotating power extraction mode only in emergency conditions, such as the failure of a primary electrical or hydraulic power system on the aircraft. In such an "emergency only" operating mode, it may not be necessary or desirable to stop the turbine wheel 46 and re-stow the vortex turbine 30 prior to landing. Where it is not desired to stop the turbine wheel 46 once it is released for rotation, there is no need for braking devices to stop rotation of the turbine wheel 46, or for apparatus for de-coupling the hub sections 32, 34 in flight to allow for re-stowing of the vortex turbine. The apparatus required for operating the vortex turbine 30 is thus considerably simplified for "emergency only" operation, as compared to embodiments of our invention in which it is desired to re-stow the vortex turbine 30 in flight.

FIG. 8 is a cross-sectional schematic representation of a vortex turbine 30 illustrating positional control and power extraction mechanism for an embodiment of our invention in which it is desired to have the ability to re-stow the vortex turbine 30 in flight, prior to landing. The mechanism illustrated also provides means for independently adjusting the angular position of either hub section 32, 34 about the axis of rotation 36, and means for adjusting the pitch of the blades 32a,b; 34a,b. In the interest of clarity and emphasizing the various aspects of our invention, additional mechanical elements such as bearings and lubrication means have been purposefully omitted from the schematic representation of FIG. 8.

FIG. 8 illustrates a vortex turbine 30 having the first and second hub sections 32, 34 mounted on a pod at the wingtip 18 for rotation about the axis of rotation 36. Drive means in the form of a shaft 54 and a gearbox 56 operably connect the second hub section 34 to a driven device 48, such as a pump or an electrical generator, mounted inside the wingtip 18.

A slidable connection 58, such as a spline, is provided between the gearbox 56 and the shaft 54 to allow the shaft 54 to translate along the axis of rotation 36, from left to right in FIG. 8, in addition to rotating about the axis of rotation 36. A compression spring 59 sandwiched between a flange 60 at the left end of the shaft 54 and a non-rotating internal flange 62 extending from the wingtip 18 urges the shaft 54 toward the left such that the second hub 34 and the shaft 54 normally are positioned longitudinally as illustrated by solid lines in FIG. 8. The faying surfaces of the first and second hub sections 32, 34 include mating teeth to form a jaw clutch 64 arrangement as shown at 64, such that when the spring 59 moves the shaft 54 to the position indicated by solid lines in FIG. 8, the jaw clutch 64 engages, locking the first and second hub sections 32, 34 together.

A linear shaft actuator means 66, such as a solenoid, a fluid cylinder, a ballscrew or cam, etc. is provided to disengage the jaw clutch 64 by moving the shaft 54 and second hub section 34 to the right, as indicated by dashed lines in FIG. 8. With the jaw clutch 64 disengaged, the second hub section 34 is free to be pivoted about the axis of rotation 36. Motive force for rotating the second hub can be provided by the vortex 28 or free stream air passing through the blades 34a,b attached to the second hub section 34. Second hub section position sensing means 68 are provided to sense the angular position of the second hub section 34 and send a signal to a vortex turbine control unit 70. The control unit 70 monitors the position of the second hub section 34 in comparison to a desired angular position, and sends signals to the shaft linear motion actuator 66 to selectively engage or disengage the jaw clutch 64 until the desired angular position of the second hub section 34 is achieved.

In some embodiments of our invention, it may be desirable to provide alternative means for producing motive force for rotating the second hub section 34 to a desired angular position. For example, the driven device 48 can be configured to function alternatively as a motor to drive the shaft 54. A separate drive motor 72, operably connected to the gearbox 56, could also be utilized.

A remotely operated locking pin 74 is provided in FIG. 8 to lock the first hub section to the wingtip 18 and thereby prevent rotation of the first hub section 32 about the axis 36. A first hub section position sensor 76 is operatively connected to sense the angular position of the first hub section 32, via a drive gear meshing with corresponding gear on the first hub section 32, for instance, as indicated at 78. The first hub section position sensor 76 sends a signal to the control unit 70 for comparison to a desired position of the first hub section 32. If adjustment is needed, the control unit 70 sends appropriate signals to disengage the locking pin 74 so that the first hub section 32 may be pivoted about the axis of rotation 36 to the desired position. The first hub section 32 may be repositioned by leaving the jaw clutch 64 engaged and utilizing any of the previously described source of motive force for repositioning the second hub section to drive the first hub section 32, by virtue of the jaw clutch's 64 engagement with the second hub section 34. Preferably, however, the first hub position sensor 76 will be configured to also operate as a drive motor for positioning the first hub section 32. Once the first hub section 32 is properly positioned, the control unit commands the locking pin 74 to re-engage, thereby locking the first hub section 32 against further rotation.

Figure 9:
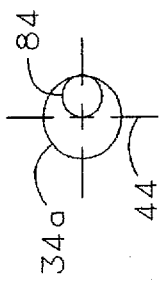
FIG. 9 is a view taken along section line 9—9 in FIG. 8 illustrating an eccentric cam follower element of a blade pitch-change mechanism according to our invention.

As shown in FIGS. 8 and 9, a blade pitch change mechanism is also provided in the form of a pitch change linear actuator 82 operably connected to drive the blades 32a,b; 34a,b about the pitch change axes 44 via a non-rotating sleeve 80 and an eccentric cam follower connection 84 to the blades 32a,b; 34a,b inside the first and second hub sections 32, 34. The control unit 70 sends a signal to the pitch change actuator 82, which moves the sleeve 80 linearly along the axis of rotation 36. The cam followers 84 run in annular shaped tracks 86 in the sleeve 80. Linear motion of the sleeve 80 is thus converted into pitch-change rotation 42 of the blades 32a,b; 34a,b by virtue of the eccentric action of the cam followers 84 running in the tracks 86.

For a typical flight of the aircraft 10, operation of the vortex turbine 30 described above in relation to FIGS. 2–8 is as follows. During pre-flight ground service, taxiing, and take-off, the hub sections 32, 34 are locked in the stowed position shown in FIG. 2, by the locking pin 74 and the jaw clutch 64. Once the aircraft is in flight, the control unit 70 will control the position of one or both hub sections 32, 34 and blade pitch to achieve an optimal drag reduction or vortex dissipation position, such as those depicted in FIGS. 3–6.

Specifically, the control unit 70 will monitor the positions of the hub section 32, 34, using signals supplied by the first and second hub position sensors 68, 74. The control unit will then send appropriate signals to the shaft and pitch control linear actuators 66, 82, and to the locking pin 74 to allow the angular position of the hub sections 32, 34 to be adjusted, and to adjust the pitch of the blades. The motive force for adjusting the angular position of the hub sections may be extracted from air passing through the vortex turbine 30, or be supplied by utilizing the driven device 48 and/or the first hub position sensor 76 as drive motors receiving drive signals from the control unit 70.

If it is desired to extract power from the vortex 28 or the free stream air during the flight, the control unit 70 will adjust the hub sections 32, 34 to form a circumferentially symmetrical array of blades, as shown in FIG. 4, and engage the jaw clutch 64 to lock the hub sections 32, 34 together to form the turbine wheel 46. The control unit 70 will then command the locking pin 74 to disengage, thereby releasing the turbine wheel 46 to be driven by the vortex 28 and/or free stream air passing through the turbine wheel 46, as shown in FIG. 7. Once released, the vortex 28 and/or free stream air will drive the turbine wheel 46 at an operating speed of about 200–2000 rpm. The shaft 54 extending from the second hub section 34 will transfer this rotation to the gearbox 56 via the splined coupling 58. The gearbox 56 steps up the rotational speed to 4,000–30,000 rpm to drive the driven device 48.

If it is desired to stop and re-stow the vortex turbine 30 prior to landing, the driven device 48 and/or the first hub section position sensor/motor 76 are utilized as dynamic braking devices to slow and stop rotation of the turbine wheel 46. After the turbine wheel 46 has been stopped, the control unit 70 sequentially actuates the shaft linear actuator 82, locking pin 74, and drive motors 48, 76, 72, etc. to pivot the hub sections 32, 34 to the stowed position of FIG. 2. The locking pin 74 and jaw clutch 64 are then engaged to lock the hub sections 32, 34 in the stowed position for landing and ground operation.

From the foregoing descriptions, those skilled in the art will readily recognize that the aircraft of our invention overcomes problems encountered in prior attempts to utilize vortex turbines on aircraft for drag reduction, vortex dissipation or energy extraction. Specifically, our invention provides an effective and efficient means for dissipating or extracting energy from a lift induced vortex emanating from an aircraft. The vortex turbine of our invention may be conveniently stowed during take-off, landing, or ground operations in such a manner that the blades of the vortex turbine do not extend below a minimum ground clearance or beyond a maximum horizontal extension of the wing, thereby maximizing ground clearance and accessibility for ground service operations. In particular, our invention provides convenient stowage of rotating vortex turbines having a circumferentially symmetric array of blades in such a manner that the blades of the vortex turbine do not extend below a minimum ground clearance or beyond a maximum horizontal extension of the wing. The vortex turbine of our invention may be readily manufactured and incorporated into either new or existing aircraft in an inexpensive straightforward manner.

We wish to emphasize that although we have described our invention herein with respect to several specific embodiments thereof, many other embodiments and applications of our invention are possible within the scope of our invention as described in the appended claims. For example, our invention is applicable to vortex turbines having more or less blades than the four bladed version depicted in FIGS. 2–6, or having more than two hub sections.

We particularly wish to emphasize that the control and actuation means depicted and described with reference to FIG. 8 are but one example of the virtually unlimited variety of actuation devices which may be used with facility in practicing our invention. Furthermore, those skilled in the ad will readily recognize that some or all of the features and functions of our invention may be utilized independently, or in combinations other than those specifically described or depicted herein without exceeding the scope of our invention. It is understood, therefore, that the spirit and scope of the appended claims should not be limited to the specific embodiments described and depicted herein.

We claim:

1. In an aircraft having a body defining a fore and aft axis of said aircraft and a wing extending generally horizontally from said body to a wingtip at the distal end of said wing such that said aircraft and said wing define a minimum ground clearance of said wing and said wingtip defines a maximum horizontal extension of said wing, a deployable vortex turbine disposed to intercept a lift induced vortex generated by a portion of said wing said deployable vortex turbine comprising:

a turbine including a first and second hub section disposed about an axis of rotation within the lift induced vortex, each of said first and second hub sections having at least one blade extending generally radially therefrom with respect to said axis of rotation;

means for rotating at least one of said hub sections about said axis between a deployed position whereat said at least one blade on said rotatable hub section extends either below said minimum ground clearance or beyond said maximum horizontal extension of said wing to a stowed position at which said blade on said rotatable hub section does not extend below said minimum ground clearance or beyond said maximum horizontal extension of said wing.

2. The aircraft of claim 1 wherein said blades are attached to said hub sections in such a manner that none of the blades on either of said hub sections extend below said minimum ground clearance or beyond said maximum horizontal extension of said wing when said rotatable hub section is in the stowed position.

3. The aircraft of claim 1 wherein the blades are attached to each of the hub sections in such a manner that the blades on both hub sections in combination form a circumferentially symmetric array of blades about the axis of rotation when the rotatable hub is in the deployed position.

4. The aircraft of claim 3 wherein the blades on the hub sections form a circumferentially symmetric array of equally spaced blades.

5. The aircraft of claim 1 wherein:

one of the hub sections includes a plurality of blades extending generally radially therefrom to form an array of blades extending from that hub section, and said blades in said array of blades are circumferentially spaced about said axis of rotation such that when said hub section having said plurality of blades is in said stowed position none of the blades in said array extend below said minimum ground clearance or beyond said maximum horizontal extension of said wing.

6. The aircraft of claim 1 wherein said means for rotating at least one of said hub sections includes a drive source operably coupled by drive means to cause said rotation of said rotatable hub section.

7. The aircraft of claim 1 wherein said means for rotating at least one of said hub sections includes locking means for locking said rotatable hub section in either said deployed or stowed positions, and motive force for rotating said rotatable hub section is provided by said lift induced vortex.

8. The aircraft of claim 1 wherein:

both of said first and second hub sections are rotatable about said axis;

said turbine further includes means for locking together said first and second hub sections for rotation as an integrally joined turbine wheel about said axis of rotation, and in such a manner that said blades on said hub sections form a turbine wheel having said blades disposed to form a circumferentially symmetric array of equally spaced blades about the axis of rotation; and wherein said vortex turbines further includes drive means for operably coupling said turbine wheel to said driven device in such a manner that said turbine wheel will drive said driven device when said turbine wheel is driven by said lift induced vortex or other air flow about said wing.

9. The aircraft of claim 8 wherein said driven device is adapted for attachment to said wing at a point within said wing.

10. The aircraft of claim 1 wherein said blades are rotatably mounted about a blade pitch axis extending generally radially from said axis of rotation, and at least one of said hubs includes means for changing the pitch of said blades by rotating them about said pitch axis.

11. A deployable vortex turbine adapted to be secured to an airfoil adjacent a tip end of the airfoil whereby said vortex turbine intercepts a drag-inducing vortex fluid flow around said tip from a higher pressure surface to a lower pressure surface of the airfoil, said vortex turbine comprising:

an array of blades including a hub section mounted for rotation about an axis and having one or more blades extending from said hub section; and means for pivoting said hub section about said axis between a first and a second angular position; and means for extracting motive power from said lift induced vortex or other airflow about said airfoil for pivoting said hub section between said first and second angular positions.

12. The vortex turbine of claim 11 wherein said means for extracting motive force includes said blades.

13. The vortex turbine of claim 11 wherein said means for rotating includes means for alternatively locking said hub section in at least one of said first or second positions.

14. A method for providing dissipation of and energy extraction from, a lift induced vortex emanating from an aircraft comprising the steps of:

(a) attaching a vortex turbine to an aircraft, said vortex turbine having a circumferentially symmetrical array of blades extending from a hub mounted for rotation about an axis of rotation and disposed to intercept said lift induced vortex;

(b) providing power generating means operatively connected to said hub to be driven thereby when said hub rotates about said axis;

(c) locking said hub against rotation about said axis during portions of a flight of said aircraft wherein only drag reduction is desired; and (d) unlocking said hub to allow rotation of said hub about said axis during portions of a flight of said aircraft wherein energy extraction from said lift induced vortex to drive said power generating means is desired.

15. The method of claim 14 including the additional step of:

(e) stopping said rotation of said hub about said axis.

16. The method of claim 15 including the additional step between steps (d) and (e) of positioning said hub in a desired angular position about said axis.

17. The method of claim 14 including the further steps of:

(e) providing a pitch change mechanism operatively connected to said blades to change the pitch thereof; and (f) changing the pitch of said blades to optimize drag reduction or power extraction during the flight of said aircraft.

18. The method of claim 14 wherein said hub is divided in two separable hub sections each having attached exclusively thereto at least one of said blades and being mounted for independent rotation about said axis and further comprising the step of:

(e) adjusting a relative angular position of said hub sections about said axis, to thereby optimize drag reduction or to position the blades attached to said hub sections to a desired stowed position.

19. The method of claim 14 wherein said hub is divided in two separable hub sections each having attached exclusively thereto at least one of said blades and being mounted for independent rotation about said axis, said method further comprising the steps of:

(e) pivoting said hub sections about said axis to a relative angular position whereat said blades on one said hub section in combination with the blades on said second hub section form a circumferentially symmetric array of blades with respect to said axis;

(f) locking said hub sections together in the angular position of step (e) above; and (g) releasing said hub with said hub sections locked together for rotation about said axis.

20. The method of claim 19 comprising the additional steps of:

(h) stopping said rotation of said hub about said axis.

21. The method of claim 20 including the additional step between steps (g) and (h) of positioning said hub in a desired angular position about said axis.

22. The method of claim 19 comprising the additional steps of:

(h) stopping said rotation of said hub about said axis;

(i) unlocking said hub sections from one another to allow independent rotation thereof with respect to one another about said axis; and (j) adjusting the relative angular positions of said hubs about said axis, to a desired relative angular position, thereby optimizing drag reduction or positioning the blades attached to the hub sections in a desired stowed position.

23. The method of claim 22 including the additional step between steps (g) and (h) of positioning said hub in a desired angular position about said axis.

24. In an aircraft generating a lift induced vortex, a vortex turbine disposed within said lift induced vortex, said vortex turbine comprising:

first and second hub sections mounted for independent rotation about a common axis of rotation and each having one or more blades mounted thereon;

said hub sections being rotatable relative to each other to shift said blades from a stowage position to one or more usage positions for alternatively or simultaneously reducing drag on said aircraft, dissipating said vortex, or extracting energy from said lift induced vortex or free stream air passing through the vortex turbine.

* * * * *